Patented Jan. 3, 1933

1,893,248

UNITED STATES PATENT OFFICE

FRANK V. SANDER, OF NEW BRUNSWICK, NEW JERSEY, ASSIGNOR TO JOHNSON & JOHNSON, OF NEW BRUNSWICK, NEW JERSEY, A CORPORATION OF NEW JERSEY

MANUFACTURE OF MERCURI-MONONITRO-PARA-CRESOL AND ITS SALTS

No Drawing. Application filed February 20, 1930. Serial No. 430,124.

The invention has for its object the production of a germicide or antiseptic of marked stability and efficiency and it is particularly addressed to the production and treatment of mercury derivatives of mono-nitro-para-hydroxytoluene and salts which may be formed from such derivatives; and the nature of the invention consists in the method and product thereof whereby soluble mercuric salts are caused to react with 3-nitro-4-hydroxytoluene.

The product, termed acetoxymercuri-mono-nitro-para-cresol, may be prepared, for example, by dissolving ten grams of 3-nitro-4-hydroxytoluene in 150 c. c. of water containing 2.7 grams of sodium hydroxide and filtering the solution. The latter is then heated to about boiling temperature whereupon a solution of 20.8 grams of mercuric acetate or mercuric chloride in 100 c. c. of water containing 0.5 c. c. of acetic acid is slowly added. The mixture is slowly boiled for about an hour, cooled and the precipitate filtered off. This is washed with cold water and dried. The product is yellow in color, stable to alkali and fairly stable to alkali sulphides; chars and decomposes when heated strongly. As indicated, a proportionate amount of mercuric chloride may be substituted for mercuric acetate.

The described compound or product is insoluble in cold water, but it can be rendered water-soluble by suspending it in boiling water and an alkali. For example, sodium hydroxide is added until almost all insoluble material has entered into solution. Filtering is then resorted to and the insoluble portion is discarded. The dark red solution is then evaporated in vacuo at a low temperature in an atmosphere from which all carbon dioxide has been removed, until crystallization ensues. Crystallization may be accelerated or promoted by cooling in an ice or brine bath. The orange red crystals are then removed by filtering off the liquid and washed with ice water containing a small amount of free alkali devoid of carbonates. The crystals are then dried in vacuo.

The new compound is highly germicidal even in the presence of organic matter; is very soluble in water; stable to alkali and alkali sulphides; does not precipitate protein or albumen from solution and shows great penetration power even in dilute solutions. When sodium hydroxide is used, this salt may be described as the sodium salt of hydroxymercuri-3-nitro-4-hydroxytoluene or the sodium salt of hydroxymercuri-3-nitro-para-cresol. Careful purification and isolation of this salt shows that, upon analysis, it may contain one molecule of water of crystallization and 48.7 per cent mercury. The theoretical amount of mercury for salt containing one molecule of water of crystallization is 48.96 per cent.

The described product, when in moist state or in solution, readily absorbs carbon dioxide, the effect of which in the case of the described sodium salt, leads to precipitation of the compound from the solution. Such precipitation by exposure to the air may be obviated or definitely delayed by the use of a slightly alkaline solution or by the use of a so-called "buffer" solution. For example, practice has demonstrated that if a solution of the sodium salt of hydroxymercuri-3-nitro-4-hydroxytoluene is made in one per cent sodium phosphate, that much longer exposure to air is necessary before any precipitation can take place. Evidently other buffer solutions are adapted to the purpose stated and will readily occur to those skilled in the art.

Having described the invention, the following is claimed:

1. The organic mercurial compound acetoxymercuri-mono-nitro-para-cresol.

2. An organic mercurial compound, consisting of the reaction product of soluble mercuric salts and 3-nitro-4-hydroxytoluene, containing one molecule of water of crystallization and about 48.7 per cent mercury.

3. The method of producing a germicide of marked efficiency and stability, which consists in causing 3-nitro-4-hydroxytoluene to react with mercuric compounds.

4. The method of producing a germicide of marked efficiency and stability, which consists in causing 3-nitro-4-hydroxytoluene to react with mercuric compounds in the presence of an alkali.

5. The method of producing a water soluble germicide of marked efficiency and stability, which consists in causing 3-nitro-4-hydroxytoluene to react with mercuric compounds in the presence of alkali isolating the compound in vacuo at a low temperature and under non-carbon dioxide environment conditions, and then treating it with a buffer solution.

6. The method of producing a water soluble germicide of marked efficiency and stability, which consists in causing 3-nitro-4-hydroxytoluene to react with mercuric compounds in the presence of alkali, and preparing the compound for storage by treating it with a sodium phosphate solution calculated to allay precipitation.

7. The new germicide consisting of the reaction product of soluble mercuric salts and 3-nitro-4-hydroxytoluene and a buffer solution.

8. The new germicide consisting of the reaction product of soluble mercuric salts and 3-nitro-4-hydroxytoluene and a one per cent aqueous solution of tri-sodium-phosphate.

In testimony whereof I affix my signature.

FRANK V. SANDER.